United States Patent [19]

Gale

[11] 4,410,683

[45] Oct. 18, 1983

[54] AROMATIC, MELT-PROCESSIBLE (CO)POLYESTERS

[75] Inventor: David M. Gale, Wilmington, Del.

[73] Assignee: E. I. Du Pont de Nemours and Company, Wilmington, Del.

[21] Appl. No.: 328,841

[22] Filed: Dec. 9, 1981

[51] Int. Cl.³ .................. C08G 63/18; C08G 63/60
[52] U.S. Cl. .................. 528/125; 528/126; 528/128; 528/173; 528/176; 528/183; 528/184; 528/190; 528/191; 528/192; 528/193; 528/194; 528/206; 528/271; 528/274; 528/296; 528/299; 528/220
[58] Field of Search ........... 528/125, 126, 128, 173, 528/176, 190, 191, 192, 193, 194, 271, 274, 206–209, 220, 296, 299, 183, 184

[56] References Cited

U.S. PATENT DOCUMENTS

| | | | |
|---|---|---|---|
| 4,066,620 | 1/1978 | Kleinschuster et al. | 528/191 |
| 4,118,372 | 10/1978 | Schaefgen | 528/190 |
| 4,161,470 | 7/1979 | Calundann | 528/190 |
| 4,184,996 | 1/1980 | Calundann | 260/40 R |
| 4,188,476 | 2/1980 | Irwin | 528/190 |
| 4,217,440 | 8/1980 | Barkey | 528/274 |
| 4,219,461 | 8/1980 | Calundann | 260/40 P |
| 4,242,496 | 12/1980 | Jackson, Jr. et al. | 528/190 |
| 4,248,980 | 2/1981 | Bi et al. | 525/271 |
| 4,248,981 | 2/1981 | Milkovich | 525/271 |
| 4,248,982 | 2/1981 | Bi et al. | 525/271 |
| 4,248,983 | 2/1981 | Bi et al. | 525/314 |
| 4,248,984 | 2/1981 | Bi et al. | 525/314 |
| 4,256,624 | 3/1981 | Calundann | 260/40 R |
| 4,267,304 | 5/1981 | Feasey et al. | 528/193 |
| 4,279,803 | 7/1981 | Calundann | 260/40 P |
| 4,285,852 | 8/1981 | East | 260/37 R |

FOREIGN PATENT DOCUMENTS 1579779 11/1980 United Kingdom .

Primary Examiner—Lester L. Lee

[57] ABSTRACT

There is disclosed an aromatic, melt-processible, fiber-forming (co)polyester of a specified formula having recurring hydroxy-acid units bonded to a specified tie-point moiety, 2–4 different recurring hydroxy-acid units being present in from about 20–80 mole percent while the other different recurring unit(s) are present in a total of from about 80–20 mole percent. There are also disclosed fibers and other shaped articles made therefrom. Some of the disclosed (co)polyesters are mesogenic.

20 Claims, No Drawings

AROMATIC, MELT-PROCESSIBLE (CO)POLYESTERS

BACKGROUND OF THE INVENTION

The present invention relates to aromatic copolyesters. More specifically, the invention relates to branched aromatic copolyesters which are fiber-forming, melt-processible, and in some instances are star-branched and/or capable of forming anisotropic melts. The terms "anisotropic", "thermotropic" and "mesogenic" have the same meaning and are used interchangeably herein.

U.S. Pat. No. 4,066,620, issued to Kleinschuster et al on Jan. 3, 1978, discloses anisotropic-melt-forming copolyesters of fiber-forming molecular weight consisting essentially of units derived from specified dihydric phenols and terephthalic acid or naphthalene-2,6-dicarboxylic acid. Dihydric phenol units of two different specified types are present in a mole ratio within the range of from about 85/15 to 60/40. The total of dihydric phenol units is present in a substantially equimolar amount with the acid units.

U.S. Pat. No. 4,118,372, issued to Schaefgen on Oct. 3, 1978, discloses a fiber-forming, melt spinnable (co)-polyester capable of forming an optically anisotropic melt and consisting essentially of recurring units selected from (I) $-\!(\text{O}-\text{R}_1-\text{O})\!-$
(II) $-\!(\text{OC}-\text{R}_2-\text{CO})\!-$ and/or
(III) $-\!(\text{O}-\text{R}_3-\text{CO})\!-$ wherein units I and II, if present, are present in substantially equimolar amounts; $R_1$, $R_2$ and $R_3$ are radicals selected from (1) single and fused 6-membered aromatic carbocyclic ring systems wherein the chain extending bonds of the ring system, if attached to the same ring, are positioned 1,4- to each other, and if attached to different rings, are in positions parallel and oppositely directed, and (2) multiple six-membered aromatic carbocyclic ring systems in which the individual rings are joined by a chemical bond or a trans-vinylene group and in which chain extending bonds of each ring are in the 1,4-positions.

U.S. Pat. No. 4,161,470, issued to Calundann on July 17, 1979, discloses a melt-processible wholly aromatic polyester capable of forming a thermotropic melt phase at a temperature below approximately 350° C. consisting essentially of the recurring moieties I and II wherein I is

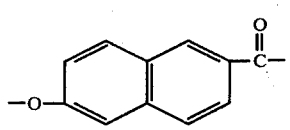

A.

and II is

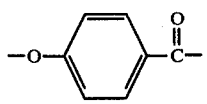

B.

and wherein said polyester comprises approximately 10 to 90 mole percent of moiety I and approximately 10 to 90 mole percent of moiety II. The reference discloses copolymers of p-acetoxybenzoic acid and 6-acetoxy-2-naphthoic acid.

U.S. Pat. No. 4,217,440, issued to Barkey on Aug. 12, 1980, discloses a method for preparing branched polyesters in melt or solid phase comprising (1) forming a condensation polymer by reacting together a diol, a diacid, and a polyfunctional modifier having at least three functional radicals, and (2) polycondensing said polymer in the presence of transesterification catalyst at a reaction temperature and reaction pressure effective to form a polyester of linear extension and branching, the improvement comprising polycondensing said polymer while correlating the activity of said catalyst, said temperature and said pressure to restrain the extent of reaction for said linear extension to within about 0.1% of the extent of reaction for said branching. Suitable acids include terephthalic acid and naphthalene dicarboxylic acid and suitable modifiers include trimesic acid, trimellitic acid, pyromellitic acid, and pentaerythritol.

Other patents which disclose anisotropic aromatic polyesters include U.S. Pat. Nos. 4,184,996; 4,188,476; 4,219,461; 4,242,496; 4,256,624; 4,267,304; 4,279,803; and 4,285,852.

U.S. Pat. Nos. 4,248,980–4,248,982 disclose star-block copolymers having good impact properties and clarity and containing 60–90% by weight of a monovinyl aromatic compound and 40–10% by weight of a conjugated diene of 4–8 carbon atoms, which, in each case, have an average structure of a specified general formula. The copolymers are made by a process which requires the use of (a) hydrocarbyllithium initiator to form linear segments which are ultimately coupled to a polyfunctional coupling agent, such as pyromellitic dianhydride and mellitic acid chloride.

U.S. Pat. No. 4,248,983, issued to Bi et al on Feb. 3, 1981, discloses transparent, impact-resistant, thermoplastic star-block copolymers having good impact resistance at low temperature (−20° to −40° C.) as well as at room temperature, said copolymer containing 60–95% by weight of a monovinyl aromatic compound and 40–5% by weight of a conjugated diene having 4–8 carbon atoms. The copolymers have a specified general formula and are made by a process which requires the use of a hydrocarbyllithium initiator.

U.S. Pat. No. 4,248,984 discloses similar star-block copolymers containing 60–90% by weight of a monovinyl aromatic compound and 40–10% by weight of a conjugated diene and having a different general formula.

British Pat. No. 1,579,779 discloses a flame retardant composition having improved melt strength for molding comprising (a) a branched, high molecular weight poly(alkylene terephthalate or isophthalate) resin having a melt viscosity of at least 15,000 poise, comprising a high molecular weight poly(alkylene terephthalate or isophthalate) and from 0.05 to 3 mole percent, based on the terephthalate or isophthalate units, of a branching component which contains at least three ester-forming groups; and (b) a flame retarding amount of a flame retardant as defined therein. Suitable branching components include trimesic acid, pyromellitic acid, and pentaerythritol.

Conventional thermotropic polyesters which are especially useful for the preparation of high-strength fibers suitable for applications, such as tire cord, cable and the like, are substantially linear, crystalline materials the strength of which can usually be improved in the fiber direction by heat-treating the unrestrained as-spun fibers. Such fibers are usually weak in the transverse direction. Thus, there is a need for polyesters which form fibers having significantly improved transverse strength properties in addition to fiber-direction properties substantially equivalent to those of conventional linear polyesters.

SUMMARY OF THE INVENTION

The present invention provides an aromatic, melt-processable, fiber-forming (co)polyester having the general formula $QX_n$ wherein Q is $R^1\!\!-\!\!(O)_n$ or $R^2\!\!-\!\!(CO)_n$ where $R^1$ and $R^2$ are n-valent hydrocarbyl radicals of 4–20 carbon atoms and n is an integer from 2–10; and X consists essentially of 2–4 different recurring hydroxy acid units $-(OR^3)-CO-$ wherein $R^3$ for each different acid unit is independently a divalent aryl radical of 6–30 carbon atoms selected from the group consisting of (1) a single aromatic ring or fused, co-linear, aromatic ring system of 2–3 six-membered rings wherein chain extending bonds of the ring system are
  (a) in 1,4- or 1,3-positions if said bonds are attached to the same ring or in 1,2-, 1,3- or 1,4-positions if the divalent aryl radical has a single ring;
  (b) in 1,5-, 2,6- or 2,7-positions if said bonds are attached to different rings of a fused two-ring or three-ring system; and (2) an aromatic two-ring system in which individual rings are joined by a single bond or a divalent radical selected from

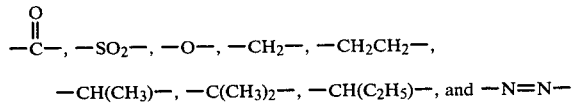

and in which chain extending bonds of each ring are in 1,3- or 1,4-positions; with the proviso that one of the different recurring units is present in from about 20 to about 80 mole percent and the other different recurring units are present in a total of from about 80 to about 20 mole percent based on the total hydroxy acid units, and the total number, m, of said units per X moiety is from about 10 to about 3000;

said polyester having a flow temperature of from about 200° C. to about 375° C.

Branched (co)polyesters of the invention form fibers having significantly improved transverse strength properties while also having fiber-direction properties substantially equivalent to those of linear polyesters.

DETAILED DESCRIPTION OF THE INVENTION

The polyesters of this invention are comprised of two or more, preferably at least three, linear polyester chains radiating from a single nucleus (atom, single aromatic ring or fused ring system). As described herein, a polyfunctional compound, i.e. a polycarboxylic acid or polyol, or derivative thereof, containing 2 to 10, preferably 3 to 5, carboxyl or hydroxyl groups provides the nucleus or tie-point from which the linear polyester chains radiate. The number of such chains radiating from a tie-point is equal to the number of functions present in the polyfunctional compound, i.e. the value of n in the general formula. When n is 3 or more, the polyesters of the invention are termed "star-branched". Providing the polyfunctional tie-point compound contains only hydroxyl or only carboxyl functions, as described herein, additional branch points do not occur. The expression hydrocarbyl as used herein means hydrocarbon radical.

Preferred (co)polyesters of the invention are those of the general formula wherein n is from 3 to 10, most preferably from 3 to 5; said (co)polyesters are star-branched. Also, preferred are (co)polyesters of the invention wherein m is from about 100 to about 2000. Most preferred are polyesters of the invention which are capable of forming optically anisotropic (mesogenic) melts.

Included in the invention are (co)polyesters wherein the divalent aryl radical constituting $R^3$ is substituted with one or more substituents selected from the group consisting of halogen, alkyl of 1–4 carbon atoms, alkoxy of 1–4 carbon atoms and phenyl.

The invention further includes (co)polyester mixtures consisting essentially of (1) at least two (co)polyesters of the formula $QX_n$ where Q is different for each (co)polyester and preferably n is 2 for one of the (co)polyesters and at least 3 for another; or (2) a (co)polyester made from polycondensation of a diacid and a diol and at least 75 mole percent of a (co)polyester of the formula $QX_n$, preferably at least 90 mole percent.

Two essential requirements must be met to achieve exclusive star-branching in polyesters (and in condensation polymers generally): (i) the main chain monomer units comprising X in the general formula $QX_n$ are all of the AB type, i.e. hydroxy acids, rather than diacids and diols which are AA and BB types; (ii) the polyfunctional compound from which the tie-point Q is derived contains only functions which are either all A or all B-type; i.e. such species must be exclusively polyacids or polyols, or operable derivatives thereof. Failure to meet either requirement may result in additional and/or randomized branching.

Hydroxy-acid units which comprise X in the polyesters $QX_n$ include, but are not limited to, the following:

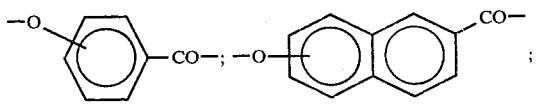

either of the foregoing substituted with one or more groups selected from halogen, alkyl of 1–4 carbon atoms, alkoxy of 1–4 carbon atoms, and phenyl;

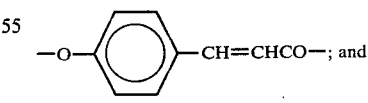

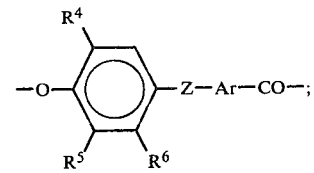

wherein Ar is 1,4- or 1,3-phenylene, Z is a single bond, or a divalent radical selected from

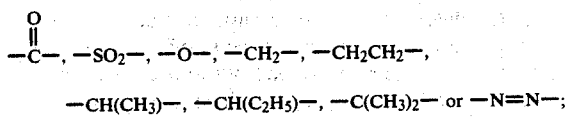

and $R^4$, $R^5$ and $R^6$ are, independently, selected from the group consisting of H, halogen, alkyl of 1–4 carbon atoms, alkoxy of 1–4 carbon atoms and phenyl. Polyesters of the invention having hydroxy-acid units derived from 1,4-phenylene, 2,6-naphthalene and

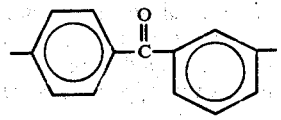

are preferred; those having hydroxy acid units derived from 1,4-phenylene and 2,6-naphthalene are most preferred.

In the (co)polyester of the invention X of the general formula is comprised of from 2 to 4, preferably 2, different recurring hydroxy acid units. One of these units is present in from about 20 to about 80 mole percent, preferably from about 30 to about 70 mole percent, and the other different recurring hydroxy acid units are present in a total of from about 80 to about 20 mole percent, preferably from about 70 to about 30 mole percent, said mole percentages being based on the total moles of hydroxy acid units in the polyester $QX_n$.

Polyfunctional tie-point compounds which provide Q in the general formula are aromatic polyols of the formula $R^1(OH)_n$ or aromatic polycarboxylic acids of the formula $R^2(CO_2H)_n$ where $R^1$, $R^2$ and n are as defined above, or are operable derivatives thereof; for example lower alkyl or phenyl esters of polyols or polyacids, or anhydrides or acyl halides of polyacids.

$R^1$ includes, but is not limited to, the radicals:

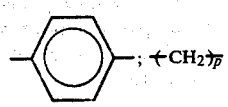

where p is an integer of 2 to 6;

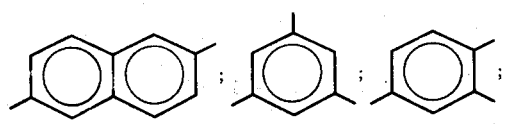

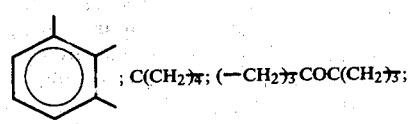

Preferably, $R^1$ is a benzene diyl or triyl or $-C(CH_2)-4$.
$R^2$ includes, but is not limited to, the radicals:

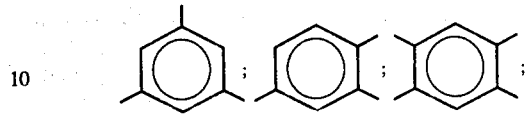

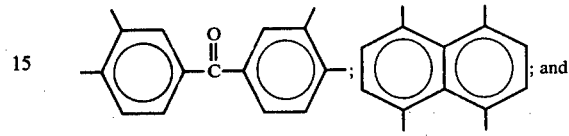

Preferably, $R^2$ is a benzene diyl or triyl. Q is preferably derived from a trihydroxybenzene, trimesic acid, terephthalic acid or hydroquinone. The triacetoxybenzenes and trimesic acid are the most preferred tie-point compounds.

The degree of polymerization, and hence the molecular weight, of star-branched polyesters is largely determined by the concentration and functionality of tie-point compound(s) present in relation to hydroxy acid monomer units. Mixtures of polyesters of the general formula $QX_n$ may be prepared by adding more than one polyfunctional tie-point compound, provided each such compound has the same functionality type (A or B).

The (co)polyesters of this invention, and mixtures thereof with conventional linear polyesters, have flow temperatures of from about 200° C. to about 375° C. and a sufficiently high molecular weight to exhibit fiber and film-forming properties. For soluble polymers, inherent viscosities of at least 1, preferably at least 2, measured as described hereinafter, are useful for fibers and shaped articles. It should be understood that not all combinations of reactants mentioned herein will produce useful polyesters. Those producing polymers with flow temperatures in excess of 375° C. should be avoided, as such high melting products are difficult to process, e.g., spin into useful fibers. Depending on structure, rapid decomposition of the (co)polyesters occurs at higher temperatures, i.e., about 375° C.

It is well known that linear aromatic (co)polyesters consisting of X units can be prepared by polymerizing AB-type monomers, i.e. aromatic hydroxy acids in the absence of AA or BB bifunctional compounds. However, these conventional polyesters are not star-branched; indeed the art strongly teaches the desirability of linear polymers in the preparation of high strength fibers. Moreover, the conventional polyesters differ from the polyesters of general formula $QX_n$ wherein n is 2 in at least two ways: polyesters $QX_2$, prepared by polymerizing AB-type monomers in the presence of AA or BB bifunctional compounds, have end-groups which are either all A or all B and the molecular weight distribution is generally relatively narrow, theoretical $\overline{M}_w/\overline{M}_n$ is 1.5. Conventional linear AB polyesters comprised of X units will have both A and B-type end groups and a broader molecular weight distribution wherein the statistically most-probable $\overline{M}_w/\overline{M}_n$ is 2.0. Molecular weight is effectively controlled in the $QX_2$ polymerization system by controlling the relative molar amounts of hydroxy-acid monomer units and tie-point compound(s).

The expression "co-linear aromatic ring system" as used herein means that all of the rings of the system have their centers on approximately the same line. Thus, hydroxy acids derived from aromatic compounds such as phenanthrene and the like are not included among hydroxy acids usable in the present invention.

PROCESS OF PREPARATION

In the process of preparing the polyesters $QX_n$ of this invention, two to four aromatic hydroxy acids, or suitable derivatives thereof, e.g. lower alkyl or phenyl esters, anhydrides or acyl halides, are (co)polymerized (polycondensed) in the presence of one or more tie-point compounds, as defined herein, in appropriate concentration. Preferably, one of the functions in the hydroxy acids and the same function, when present, in the tie-point compound(s) are first converted to a derivative, such as an ester function, to facilitate purification of these starting materials. Preferably, the hydroxyl functions are so converted. Melt polymerization, as described, for example, in U.S. Patents 4,118,372 and 4,161,470, is preferred. Molar ratios of total AB units to tie-point compounds can vary from about 30,000:1 to about 20:1, preferably from about 20,000:1 to about 300:1.

A polymerization catalyst may optionally be employed. Suitable catalysts known in the art include p-toluene sulfonic acid, tertiary amines such as triethylamine, metal oxides such as $Sb_2O_3$ or $As_2O_3$, metal acetates such as magnesium or calcium acetate, alkyl titanates and the like.

Another method of preparing polyesters of general formula $QX_n$ is to contact one or more pre-polymerized conventional linear aromatic polyesters comprised of X units with an appropriate tie-point compound under polycondensation reaction conditions, which are preferably melt polymerization conditions, optionally including a catalyst as previously described. If polycondensation is allowed to proceed to completion, i.e. until equilibrium is attained, the product will consist essentially of $QX_n$ polyester. If equilibrium is not attained, the product will comprise $QX_n$ polyester admixed with residual conventional polyester(s). Such mixtures are often desirable and may be "tailored" by control of polycondensation conditions, especially time, temperature, and, if a catalyst has been used, its type and concentration. Such control methods will be obvious to an artisan of ordinary skill. Temperatures will be in the range between polyester melting point and decomposition point, preferably 10° to 50° above the melt point. Reaction time may vary from about 1 second to several hours.

A catalyst, as described previously, may be added to the pre-formed linear polyester(s) and polyfunctional compound(s) reaction mixture to increase polycondensation or equilibration rate, or such catalysts may, optionally, be present in the pre-formed polyester(s), after the catalyst was used in the preparation of the pre-formed polyester(s). If a catalyst is employed in the polycondensation reaction, its concentration should not normally exceed about 1 part per hundred parts of total reactants and should also not exceed 10 wt % of the star-branching compound present.

Polycondensation of conventional linear polyesters and polyfunctional tie-point compound as described herein is conveniently carried out in heated equipment suitable for melt-blending, such as a twin-screw extruder, extruder equipped with a static mixer, injection-molding machine and the like, or in stirred reactor or polymerization flask.

Mixtures (blends) of $QX_n$ polyesters or mixtures of one or more $QX_n$ polyesters with one or more conventional linear polyesters can also be prepared by conventional blending of the appropriate polymerized components under mild, non-reactive conditions. Removal of any polymerization catalysts present in the components will minimize chemical interaction. Blending in a suitable solvent such as pentafluorophenol is convenient, especially where coating applications are contemplated.

FILAMENT PREPARATION

The (co)polyesters and blends of the invention can be spun into filaments by conventional melt-spinning techniques such as those described in U.S. Pat. Nos. 4,066,620, 4,118,372 and 4,161,470. A melt of the polymer(s) is extruded through a spinneret into a quenching atmosphere, e.g. air or $N_2$ at room temperature, and wound up. An extrusion rate of about 0.1 g/min is convenient.

As used herein, the term "as-spun" fiber refers to a fiber which has not been drawn or heat-treated after extrusion and normal windup.

HEAT TREATMENT

The as-spun fibers of this invention may be subjected to heat treatment in an oven while relaxed or under mild restraint to provide high strength fibers useful for a variety of industrial applications such as plastic and rubber reinforcement. In the heat-treating process, fiber samples, as skeins or on bobbins (preferably collapsible polytetrafluoroethylene-coated bobbins) are usually heated in an oven having an inert atmosphere, $N_2$, that is continuously purged by flow of inert gas through the oven to remove by-products from the vicinity of the fiber. Temperatures approaching the fusion point, but sufficiently below to prevent interfilament fusion, are employed. Preferably, maximum temperature is reached in a stepwise fashion.

MEASUREMENTS AND TESTS

Inherent Viscosity

Inherent viscosity ($\eta_{inh}$) is defined by the following equation:

$$\eta_{inh} = \frac{\ln(\eta_{rel})}{C}$$

wherein ($\eta_{rel}$) represents the relative viscosity and C represents a concentration of 0.1 gram of the polymer in 100 ml of solvent. The relative viscosity ($\eta_{rel}$) is determined by dividing the flow time in a capillary viscometer for a solution of concentration C by the flow time for the pure solvent. Flow times are determined at 60° C. using pentafluorophenol as a solvent.

Fiber Tensile Properties

Methods described in U.S. Pat. No. 3,827,998 are used. Filament properties are measured on fibers that have been conditioned at 21° C. and 65% relative humidity (R.H.) for at least 16 hours unless otherwise specified. All measurements are made in the fiber conditioning environment.

Tenacity (breaking tenacity) (T), elongation (breaking elongation) (E), and initial modulus ($M_i$) are obtained from breaking a single filament on an Instron tester (Instron Engineering Corp., Canton, Mass.).

Single filaments are broken with a gage length (distance between jaws) of 2.5 cm (1.0 inch). The results on 3 or more filaments are averaged. All samples are elongated at a constant rate of extension (10% elongation/minute for fibers having an E of under 8%) until the sample breaks.

The denier of a single filament (dpf) is calculated from its functional resonant frequency, determined by vibrating a 7 to 9 cm length of fiber under tension with changing frequency (ASTM D1577-66, part 25, 1968). This filament is then used for 1 break.

The tenacity (grams/denier), elongation (percent), and initial modulus (grams/denier) as defined in ASTM D2101, part 25, 1968 are obtained from the load-elongation curve and the measured denier.

All properties given herein were obtained from single filaments (filament properties). It should be noted that filament properties may differ from those obtained from multifilament strands of the same sample.

Additional fiber properties measured relating to fiber strength in the transverse direction include loop strength (LS) and knot strength (KS), determined by ASTM D-3217-79, part 33, 1979.

Polymer Properties

Polymer melting behavior was determined by Differential Scanning Calorimetry (DSC); three properties are reported:
Tm=crystalline melting point;
Tg=glass transition temperature;
Tc=height of cooling crystallization peak.

The Thermooptical Test (TOT) used herein is described in U.S. Pat. Nos. 4,066,620 and 4,118,372. Polymers and blends which pass this test (TOT= +) are considered to be optically anisotropic or mesogenic.

UTILITY

The (co)polyesters and polyester mixtures of this invention are useful when fabricated into fibers, films, molded objects, or as the major component of a paint or coating.

$QX_n$ polyesters wherein n is 2 are equivalent in many properties to conventional, linear aromatic polyesters of the art, however, the narrower molecular weight distribution and uniformity of end groups of the $QX_2$ polyesters can confer additional benefits in processing and use. Since polyesters $QX_2$ have end-groups which are either all A or all B, these polyesters are polymeric diacids or diols which can be used as monomers condensable with diols or diacids, respectively, to prepare block copolymers, chain-extended polymers, cross-linked polymers, and the like. Polyesters $QX_n$ where n is 3 or above are similarly useful for preparing block copolymers and cross-linked polymers. Fibers prepared from $QX_n$ polyesters wherein n is 3 or above are equivalent to fibers prepared from conventional polyesters in fiber-direction properties, e.g. strength and high modulus, but are distinctly superior in transverse direction properties exemplified by knot and loop strength. The fibers can be spun in ordinary equipment at high wind-up speeds and may be used in ropes, cables, tire-cord, and the like. Their improved transverse properties, as measured by their added strength when stressed after knotting or looping, for example, make them suitable for end uses such as reinforcing fiber for structural composites.

Structural composites may also contain other fibrous materials, as for example, other polyesters, polyamides, polyimides and inorganic fibers such as glass, asbestos, graphite, boron, and the like. Composites will normally contain other, non-fibrous materials such as polymeric binders or matrix polymers, pigments and the like. In preparing composites, fibers may be added in chopped form or as woven fabric. The $QX_n$ polyesters are also useful in structural composites in non-fiber form as melt-processable matrix polymers to which reinforcing $QX_n$ polyester fibers and/or other fibers such as those recited above are added.

Plastic articles and films may be fabricated from the polyesters of the invention by extrusion, injecting molding, etc., with ordinary equipment. Higher speeds or cycle times can be realized with the preferred $QX_n$ mesogenic polyesters because of especially favorable rheology inherent therein.

Films and coatings may be fabricated by dissolving the polyester in a suitable solvent, such as pentafluorophenol, and allowing the solvent to evaporate after casting or coating.

Films, molded objects, and coatings prepared from the preferred mesogenic star-branched polyesters of the invention are generally more uniform than those prepared from conventional linear, mesogenic polyesters of the art. Films and coatings have good gas and moisture barrier properties together with high strength, stiffness, and hardness. Molded objects are more uniform and less wood-like in appearance.

The invention is further illustrated by the following examples in which all temperatures are in degrees Celsius unless otherwise stated.

EXAMPLE 1

Preparation of Polyester Resin

The following ingredients are charged into a 200 ml round-bottom flask under a $N_2$ atmosphere:
7.20 g (40 mmole) 4-acetoxybenzoic acid (1,4BE),
18.40 g (80 mmole) 6-acetoxy-2-naphthoic acid (2,6NE),
0.042 g (0.2 mmole) trimesic acid.
The flask is placed in a silicone oil bath and is equipped with a stirrer and a distillation headcondenser. The temperature of the silicone oil bath is slowly increased from room temperature to 258° over 1 h and 48 min. During this heating cycle a clear monomer melt is obtained which at 255° begins evolving acetic acid that is removed by the condenser. A few minutes later the melt becomes cloudy as polymer forms. The temperature is raised to 328° over 2 h and 50 min; then the stirrer is removed and vacuum applied. After cooling the resulting polymer to room temperature under vacuum overnight, the molten polymer mass is heated at 282°–314° (12 Pa, 0.09 mm pressure) for 3 h and 5 min. The resulting product, Resin A, is cooled and is recovered by breaking the reaction flask [yield=17.6 g, $\eta_{inh}$=4.8.] Resin A has a Tg of 89.5°, Tm of 285.5°, and Tc of 228°, and is anisotropic (TOT= +). Flow temperature is 290° C. An additional sample of Resin A is obtained by charging similar amounts of ingredients into a polymer tube agitated by a $N_2$-capillary bubbler and heating at vapor bath temperatures of 259° for 2 h, 305° for 2 h, and 305° for 2 h and 30 min under vacuum to remove acetic acid ($\eta_{inh}=3.6$).

EXAMPLE 2

Preparation of Polyester Resin

Polyester resins B-H are prepared using a procedure similar to that described in Example 1. The monomers, polyfunctional compounds and resin properties are given in Table 1. Resins B and E are controls.

TABLE 1

| Resin | mmoles 1,4BE | mmoles 2,6NE | Other | mmoles other | $\eta_{inh}$ | TOT Test Result | Flow, ° |
|---|---|---|---|---|---|---|---|
| B | 40 | 80 | none | 0 | 3.1–3.3 | + | 286–293 |
| C | 40 | 80 | pentaerythritol | 0.15 | 3.2–3.9 | + | 284–291 |
| D | 80 | 40 | trimesic acid | 0.20 | 3.9 | + | 253 |
| E | 80 | 40 | none | 0 | 4.4–5.4 | + | 269 |
| F | 80 | 40 | pentaerythritol | 0.15 | 5.5 | + | 264 |
| G | 80 | 40 | trimesic acid | 2.0 | 2.9 | + | 259 |
| H | 2 | 2 | pentaerythritol tetraacetate; p-toluenesulfonic acid | 0.05; 0.005 | 7.2 | + | 259 |

EXAMPLE 3

Preparation of Fibers

Polyester resin A prepared in Example 1 and polyester resins B-G prepared in Example 2 are spun into fibers by extruding their evacuated melts through a one-hole (9 mil, 0.23 mm) spinneret at about 0.1 g/min at various temperatures and wind-up rates. In some cases, the as-spun fibers are heat-treated by back-winding a sample onto a polytetraethylene-coated bobbin and heating under mild restraint in an atmosphere of $N_2$ at 270° for 24 h.

Average single-filament fiber properties are given in Table 2.

TABLE 2

| Resin | Spinning Temp. Range, ° | Wind-up Rates m/min | Heat Treated | T | % E | $M_i$ | KS | LS |
|---|---|---|---|---|---|---|---|---|
| A | 298–331 | 330–990 | no | 7.2 | 2.0 | 420 | 1.9 | 0.6 |
| B | 298–318 | 600–720 | no | 6.6 | 2.2 | 385 | 1.4 | 0.4 |
| C | 280–336 | 400–930 | no | 6.8 | 2.0 | 429 | 1.6 | 0.4 |
| D | 290–328 | 500–815 | no | 6.3 | 1.9 | 429 | 3.7 | 1.5 |
| E | 290–317 | 400–800 | no | 6.8 | 1.9 | 449 | 2.9 | 1.0 |
| F | 295–310 | 400–500 | no | 8.2 | 2.8 | 364 | 3.4 | 1.1 |
| G | 277–309 | 400–900 | no | 6.1 | 2.0 | 370 | 0.9 | 0.3 |
| A | 309 | 390 | yes | 10.0 | 3.3 | 291 | 3.8 | 1.8 |
| B | 290 | 600 | yes | 6.8 | 2.9 | 244 | 1.5 | 0.6 |
| C | 315 | 510 | yes | 11.5 | 3.5 | 295 | 2.8 | 0.9 |

*Average Single Filament Fiber Properties, gpd; 2.54 cm (one inch) lengths.

EXAMPLE 4

Preparation of Polyester Resin and Fiber Thereof

Part A

The following ingredients are charged into a glass polymer tube:
12.00 g 1,4BE (66.7 mmole)
9.47 g 4-acetoxy-3'-carboxybenzophenone (33.3 mmole)
0.042 g trimesic acid (0.2 mmole).

A $N_2$-capillary is employed to maintain agitation. The tube is heated in a vapor bath for 1 h and 46 min at 259° (acetic acid is distilled out a side-arm) and for 1 h and 55 min at 305°. At this point, a strong fiber is pulled from the melt. Vacuum is applied (13 to 3 Pa, 0.1 to 0.02 mm of Hg) and heating is continued for 2.5 h at 305°. The resin is cooled and then isolated by breaking the tube (yield, 14.7 g; DSC: Tg, 82°, 98.5°; Tm, 209.5° and 290°; Tc, 204°; $\eta_{inh}$, 1.6). The resin is spun at a 400 m/min wind-up. As-spun properties are: T/E/$M_i$, 3.6/2.3/208. Properties after heat-treatment at 280° for 16 h are: T/E/$M_i$/KS, 11.1/5.1/243/6.4. A knot strength (KS) of 6.4 gpd is an outstanding value.

Part B

The preparation of part A is repeated except that the final vacuum/heat cycle is reduced to 30 min. The polyester resin thus obtained has an $\eta_{inh}$ of 1.0, is anisotropic by the TOT test, and has a flow temperature of 318°. The resin is spun into high modulus fibers at 298°–286° at wind-up rates of 1200–1300 m/min. As-spun filament properties (gpd) are:

| T | % E | $M_i$ | KS | LS |
|---|---|---|---|---|
| 6.0 | 2.6 | 363 | 2.7 | 0.7 |

EXAMPLE 5

Preparation of Mixtures of Star-Branched and Linear Copolyesters and Fibers Thereof Polyester resins J-R are prepared using a procedure similar to that described in Example 4, Part B. Fibers are pulled from the melt on a hot bar and/or spun using a procedure similar to that described in Example 2. Reactants used and resin properties obtained are given in Tables 3 and 4.

TABLE 3

| Resin | Monomers Charged, mmoles 1,4BE | 2,6NE | Terephthalic Acid | Trimesic Acid | TOT Test Result | Flow, ° | $\eta_{inh}$ | Fibers Pulled at, ° |
|---|---|---|---|---|---|---|---|---|
| J | 40 | 80 | 0.006 | 0.014 | +,a | 318 | 4.8 | 303–314 |
| K | 40 | 80 | 0.018 | 0.005 | +,a | 316 | 6.3 | 303–319 |
| L | 60 | 60 | 0.120 | 0.095 | +,a | 275 | 5.4 | 287–303 |
| M | 80 | 40 | 0.006 | 0.014 | +,a | 267 | 4.9 | 270–286 |
| N | 80 | 40 | 0.018 | 0.005 | +,a | 245 | 4.5 | 265–283 |
| O | 80 | 40 | 0.600 | 1.430 | +,a | 258 | 3.0 | 283–299 |

TABLE 3-continued

| | Monomers Charged, mmoles | | | | TOT Test | | | Fibers Pulled |
|---|---|---|---|---|---|---|---|---|
| Resin | 1,4BE | 2,6NE | Terephthalic Acid | Trimesic Acid | Result | Flow, ° | $\eta_{inh}$ | at, ° |
| P | 80 | 40 | 1.800 | 0.480 | + | 261 | 2.3 | 266–282 |
| Q | 40 | 80 | 1.800 | 0.480 | + | 292 | 2.6 | 282–299 |
| R | 40 | 80 | 0.600 | 1.430 | +,a | 289 | 3.6 | 282–299 | a = opaque melt

TABLE 4

| Resin | Fiber Spin Temp. ° | Wind-up Rate m/min | As-Spun Fiber Properties (gpd) | | | | |
|---|---|---|---|---|---|---|---|
| | | | T | % E | $M_i$ | KS | LS |
| J | 305 | 400–700 | 8.9 | 2.8 | 427 | 1.90 | 0.45 |
| K | 324 | 400–630 | 9.3 | 3.0 | 416 | 2.42 | 0.61 |
| L | 293 | 300–600 | 10.7 | 3.2 | 396 | 2.95 | 0.84 |
| M | 290 | 500–700 | 10.0 | 3.0 | 428 | 3.35 | 1.02 |
| N | 277 | 400–700 | 7.7 | 2.6 | 332 | 2.60 | 0.64 |
| O | 305 | 400–950 | 7.2 | 2.0 | 428 | 1.02 | 0.26 |
| P | 305 | 800–1500 | 4.3 | 1.3 | 341 | 0.36 | <0.17 |
| Q | 330 | 400–1600 | 6.1 | 1.7 | 410 | 0.49 | 0.17 |
| R | 329 | 300–700 | 6.4 | 1.8 | 423 | 0.46 | 0.23 |

EXAMPLE 6

Two star-branched copolyesters, S, T, and a mixture of star-branched and linear copolyester, U, are prepared using a procedure similar to that described in Example 3, part A. Fibers are pulled from the melt on a hot bar and/or spun using a procedure similar to that described in Example 2. Reactants and resin properties obtained are set forth in Tables 5 and 6.

TABLE 5

| | Monomers Charged, mmoles | | | | | | TOT Test | | |
|---|---|---|---|---|---|---|---|---|---|
| Resin | 1,4BE | 2,6NE | Hydroquinone* | Hydroxy-Hydroquinone* | Pyrogallol* | Phloroglucinol* | Result | Flow, ° | $\eta_{inh}$ |
| S | 80 | 40 | — | 0.2 | — | — | + | 253 | 6.27 |
| T | 80 | 40 | — | — | 0.2 | — | + | 257 | 5.98 |
| U | 100.5 | 49.5 | 0.21 | 0.07 | — | 0.07 | + | 268 | 6.24 |

*as acetates

TABLE 6

| Resin | Fiber Spin Temp. (°C.) | Wind-Up Rate (m/min) | T | % E | $M_i$ | KS | LS |
|---|---|---|---|---|---|---|---|
| S | 301 | 300 | 9.3 | 2.2 | 508 | 4.0 | 1.1 |
| T | 294 | 300 | 9.3 | 2.5 | 458 | 3.6 | 1.0 |
| U | 293 | 300 | 9.9 | 2.5 | 476 | 3.6 | 1.1 |

I claim:

1. An aromatic, melt-processible, fiber-forming (co)polyester having the general formula $QX_n$ wherein Q is $R^1$—(O)—$_n$ or $R^2$—(CO)—$_n$ where $R^1$ and $R^2$ are n-valent hydrocarbyl radicals of 4–20 carbon atoms and n is an integer from 2–10; and X consists essentially of 2–4 different recurring hydroxy acid units —(OR$^3$-CO)— wherein $R^3$ for each different acid unit is independently a divalent aryl radical of 6–30 carbon atoms selected from the group consisting of (1) a single aromatic ring or fused, co-linear, aromatic ring system of 2–3 six-membered rings wherein chain extending bonds of the ring system are
  (a) in 1,4-, or 1,3-positions if said bonds are attached to the same ring or in 1,2-, or 1,3- or 1,4-positions if the divalent aryl radical has a single ring;
  (b) in 1,5-, 2,6-, or 2,7-positions if said bonds are attached to different rings of a fused two-ring or three-ring system; and (2) an aromatic two-ring system in which individual rings are joined by a single bond or a divalent radical selected from $$-\overset{O}{\underset{\|}{C}}-,\ -SO_2-,\ -O-,\ -CH_2-,\ -CH_2CH_2-,$$

$-CH(CH_3)-,\ -C(CH_3)_2-,\ -CH(C_2H_5)-,$ and $-N=N-$ and in which chain extending bonds of each ring are in 1,3- or 1,4-positions;

with the proviso that one of the different recurring units is present in from about 20 to about 80 mole percent and the other different recurring unit(s) are present in a total of from about 80 to about 20 mole percent, based on the total hydroxy acid units; and the total number, m, of said units per X moiety is from about 10 to about 3000;

said (co)polyester having a flow temperature of from about 200° C. to about 375° C.

2. A (co)polyester according to claim 1 wherein X consists essentially of 2–4 different recurring hydroxy acid units selected from the group consisting of

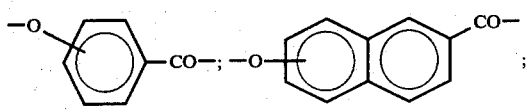

either of the foregoing substituted with one or more groups selected from halogen, alkyl of 1–4 carbon atoms, alkoxy of 1–4 carbon atoms, and phenyl;

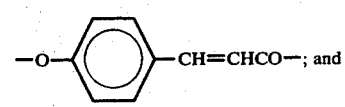

-continued

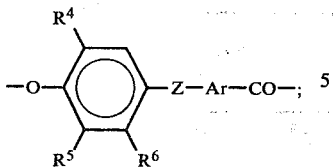

wherein Ar is 1,4- or 1,3-phenylene, Z is a single bond or a divalent radical selected from

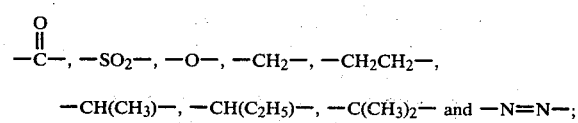

and $R^4$, $R^5$ and $R^6$ are, independently, selected from H, halogen, alkyl of 1–4 carbon atoms alkoxy of 1–4 carbon atoms and phenyl.

3. A (co)polyester according to claim 2 wherein Q is $R^1$$-(-O-)_n$ and $R^1$ is selected from the group consisting of

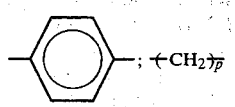

where p is an integer of from 2 to 6;

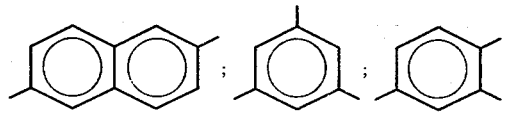

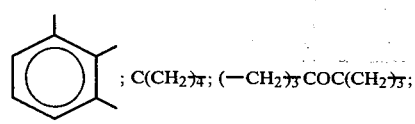

4. A (co)polyester according to claim 2 wherein Q is $R^2$$-(-CO-)_n$ and $R^2$ is selected from the group consisting of

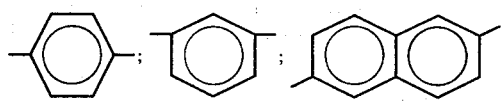

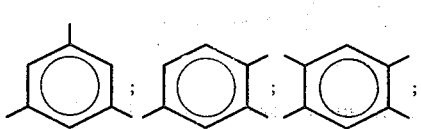

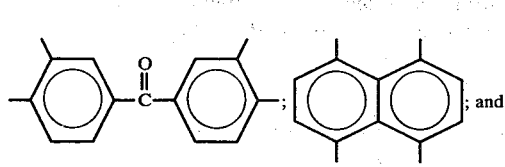

-continued

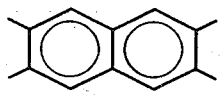

5. A (co)polyester according to claim 2 wherein m is about 100 to about 2000.
6. A (co)polyester according to claim 2 wherein n is an integer from 3–10.
7. A (co)polyester according to claim 6 wherein n is an integer from 3–5.
8. A (co)polyester according to claim 6 which is capable of forming a mesogenic melt.
9. A (co)polyester according to claim 2 wherein Q is derived from a trihydroxybenzene, trimesic acid, terephthalic acid and hydroquinone.
10. A (co)polyester according to claim 2 wherein the hydroxy-acid units of X are drived from any two of the group consisting of 1,4-phenylene, 2,6-naphthalene, and

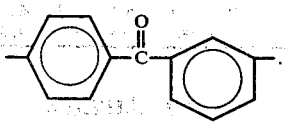

11. A (co)polyester according to claim 9 wherein the hydroxy-acid units of X are derived from any two of the group consisting of 1,4-phenylene, 2,6-naphthalene, and

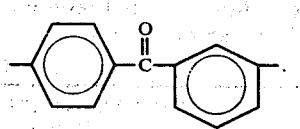

12. A (co)polyester according to claim 11 wherein Q is derived from a trihydroxybenzene or trimesic acid.
13. A (co)polyester according to claim 12 wherein the hydroxy-acid units of X are derived from 1,4-phenylene and 2,6-naphthalene.
14. A (co)polyester according to claim 12 wherein the hydroxy-acid units of X are derived from 1,4-phenylene and

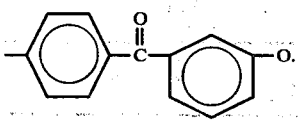

15. A (co)polyester mixture consisting essentially of at least two (co)polyester according to claim 2 wherein Q is different for each (co)polyester.
16. A (co)polyester mixture according to claim 5 wherein for one (co)polyester n is 2 and for another n is at least 3.
17. A (co)polyester mixture consisting essentially of a (co)polyester made from polycondensation of a diacid and diol and at least about 75 mole percent of a (co)polyester according to claim 2.
18. A (co)polyester mixture according to claim 17 wherein the (co)polyester according to claim 2 is present in at least 90 mole %.
19. A shaped article of a (co)polyester according to claim 1 or 2.
20. An oriented fiber of a (co)polyester according to claim 1, 2, 3, 4, 7, 8, 9, 11, 12, 13 or 14.

* * * * *